United States Patent [19]
Franchet et al.

[11] Patent Number: 5,648,037
[45] Date of Patent: Jul. 15, 1997

[54] PROCESS FOR MANUFACTURING A CLOSING DEVICE

[75] Inventors: Alain Franchet, Brasles; Vincent Guerrazzi, Amberieu en Bugey; Pierre Pellerano, Paris, all of France

[73] Assignee: Le Moulage Automatique, Chateau Thierry, France

[21] Appl. No.: 492,724

[22] Filed: Jun. 20, 1995

[30] Foreign Application Priority Data

Jun. 21, 1994 [FR] France .................................. 94 07566

[51] Int. Cl.$^6$ .............................. B28B 21/42; B65D 50/00
[52] U.S. Cl. ........................ 264/296; 215/252; 264/320; 425/393; 425/403
[58] Field of Search .................................. 264/296, 320, 264/322; 425/393, 403; 215/252

[56] References Cited

U.S. PATENT DOCUMENTS

| | | | |
|---|---|---|---|
| 4,890,754 | 1/1990 | Dorn et al. .................................. | 215/252 |
| 5,151,152 | 9/1992 | Kaenfe et al. .................................. | 264/296 |
| 5,219,507 | 6/1993 | Ingram et al. .................................. | 264/296 |
| 5,402,901 | 4/1995 | Carvalheiro et al. .................................. | 215/252 |

FOREIGN PATENT DOCUMENTS

| | | |
|---|---|---|
| 1279608 | 1/1991 | Canada . |
| 1134894 | 11/1968 | United Kingdom . |
| 2255553 | 11/1992 | United Kingdom . |

*Primary Examiner*—Jan H. Silbaugh
*Assistant Examiner*—Mark Eashoo
*Attorney, Agent, or Firm*—Nawrocki, Rooney & Sivertson, P.A.

[57] ABSTRACT

A process for manufacturing a closing device constituted by a tapped closing device and a tamper-proof ring inlcuding, on the one hand, an annular joining strip with controlled deformation and, on the other hand, an inner annular projection. A preforming of the tamper-proof ring is effected:

by axially introducing in said device a cylindrical mandrel which is provided with an annular peripheral cam such that the lower face of the inner annular projection comes into abutment against said cam, then by exerting on said device and/or on the mandrel a bearing effort whose force is sufficient to ensure a relative stroke of the mandrel in the device in contact with the cam up to a preforming position maintained for a determined time so as jointly to produce an outward bending of the strip with controlled deformation and a remanent deflection towards the closing device of the inner annular projection so that its upper face remains inclined by an angle with respect to the normal to the axis of the device.

13 Claims, 4 Drawing Sheets

PROCESS FOR MANUFACTURING A CLOSING DEVICE

FIELD OF THE INVENTION

The present invention relates to an improvement in the process for manufacturing a device for closing a flanged container, as well as to a machine for continuously carrying out the process.

BACKGROUND OF THE INVENTION

The closing devices which are more particularly concerned by this process are those constituted by a tapped closing device extended in its lower part by a tamper-proof ring joined to the closing device by a breakable connection zone; this ring comprising an annular joining strip with controlled deformation, defined on the one hand, in the lower part, by an inner annular projection whose upper face is substantially perpendicular to the axis of the device and whose lower face is inclined by an acute angle with respect to said axis and, on the other hand, in its upper part, by an outer annular projection.

These devices have in particular formed the subject matter of Applicants' International Patent Applications PCT/FR94/00145 and PCT/FR94/00144.

The processes for manufacturing such devices generally comprise moulding by injection or compression, demoulding, then an ejection of the device parallel to its axis as described in International Patent Application No. PCT/FR94/00144.

During packaging, when the device is first screwed on the flanged container, after having been filled, it is necessary to exert a tightening torque to effect a controlled deformation of the joining strip and to connect the device by clipping the inner annular projection beneath the flange.

Now, the wider the inner projection, the thicker the joining strip and the more the tamper-proof ring is rigid, this strengthening the degree of impregnability.

However, the tightening torque then becomes relatively considerable, as well as the unscrewing torque which largely depends thereon, which constitutes a drawback for the consumer.

Consequently, the technical problem resides in the search for a satisfactory compromise between an easy unscrewing (which depends mainly on the initial tightening torque) and a high degree of impregnability.

It is an object of the present invention to overcome this problem satisfactorily.

SUMMARY OF THE INVENTION

This object is attained by a process of manufacture comprising moulding of a closing device of the above-mentioned type, its demoulding then ejection parallel to its axis, characterized in that a preforming of the tamper-proof ring is then effected by introducing axially in said device a cylindrical mandrel whose diameter is slightly less than the inner diameter of the threads of the tapped closing device and which is provided with an annular peripheral cam such that the lower face of the inner annular projection comes into abutment against said cam then by exerting on said device and/or on the mandrel a bearing effort whose force is sufficient to ensure a relative stroke of the mandrel in the ring in contact with the cam up to a position of preforming maintained for a determined time so as to produce jointly an outward bending of the strip with controlled deformation and a remanent deflection of the inner annular projection towards the closing device so that its upper face remains inclined by a certain angle with respect to the normal to the axis of the device after elimination of the effort and egress of the mandrel.

According to an advantageous characteristic, the amplitude of the preforming is determined so as at least to compensate the initial deformation of the ring, produced upon ejection from the mould.

According to another feature, the remanent inclination of the upper face of the inner annular projection with respect to the normal to the axis of the device is less than or equal to 25° and is preferably included between 10° and 15°, while the remanent inclination of the outer lateral face of the lower part of the ring is included between 0° and 15° with respect to and towards the axis of the device.

Bending is preferably effected in a circular line lying on the joining strip with controlled deformation, ensuring a selective orientation of the molecular chains of the polymer constituting the ring on this line.

The bearing effort may be exerted equally well the closing device and/or the mandrel with a duration greater than or equal to the time of holding in preforming position.

According to the process of the invention, the bearing effort is included between 107 and 108 dynes and the time of holding the mandrel in preforming position is included between 0.3 and 5 s.

According to a first variant embodiment, hot preforming is effected on the device as soon as it is ejected from the mould.

According to a second variant, preforming is effected after ejection from the mould during or after cooling and complete withdrawal of the matter constituting the ring.

According to other features of the invention, the force, duration of the bearing effort as well as the relative stroke of the mandrel are determined as a function of the mechanical characteristics of the matter constituting the ring.

It may also be provided that the force, duration of the bearing effort and the relative stroke of the mandrel are determined as a function of the temperature of the ring at the moment of preforming.

It may also be provided that the force, duration of the bearing effort as well as the relative stroke of the mandrel are determined in accordance with the respective geometries of the inner annular projection and of the joining strip with controlled deformation with respect to the profiles of the flanges of containers.

The preforming according to the invention of the closing device prepares the tamper-proof ring with a view to the deformation necessary for subsequent clipping thereof. In this way, it facilitates assembly on the container, after filling, without compromising the excellent properties of tightness and impregnability of this type of device.

Moreover, the remanent deformation of the ring and in particular the remanent deflection of the inner annular projection associated with the bending of the annular joining strip with controlled deformation, makes it possible to obtain a screwing torque during bottling and consequently an opening torque by unscrewing which remains low and adapted to the consumers' wishes.

With equal opening torque, a better impregnability can therefore be obtained, particularly by using rings rendered more rigid by their profile and/or their material.

Another object of the invention is a machine for continuously carrying out the preforming of the invention. This machine comprises a dispenser of closing devices with their tamper-proof ring, conveyors intended to transfer said devices respectively firstly from the dispenser to a preforming unit then from said unit to a receptacle, characterized in that said preforming unit comprises:

a plate rotating about a vertical pin bearing a matrix for supporting and positioning the devices intended to maintain them firmly with the tamper-proof ring upward, vertical rods sliding through bearings and whose lower ends bear a cylindrical mandrel equipped with an annular peripheral cam intended to be introduced in said devices, under the action of the bearing effort exerted by the rods to place said cam in contact with the inner annular projection of the ring.

According to an advantageous feature, said supporting and positioning matrix is constituted by a disc comprising several peripheral recesses in which the closing devices of the devices are housed, centred and retained.

The phase of preforming corresponds to an angular sector of said matrix.

According to another characteristic, the end of the mandrel is bevelled and its profile and its geometry are determined as a function of the position of the cam in order never to come into contact either with the bottom or with the inner walls of the closing device during preforming.

According to yet another characteristic, said annular peripheral cam presents a useful part constituted by a plane, inclined active face with curvilinear lateral edge extending by an inactive face whose profiles and geometries are adapted to the lower face of the inner projection of the ring.

Finally, said supporting and positioning matrix is associated by mechanical synchronization with rotating toothed wheels for supply and evacuation, working in line with the conveyors.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
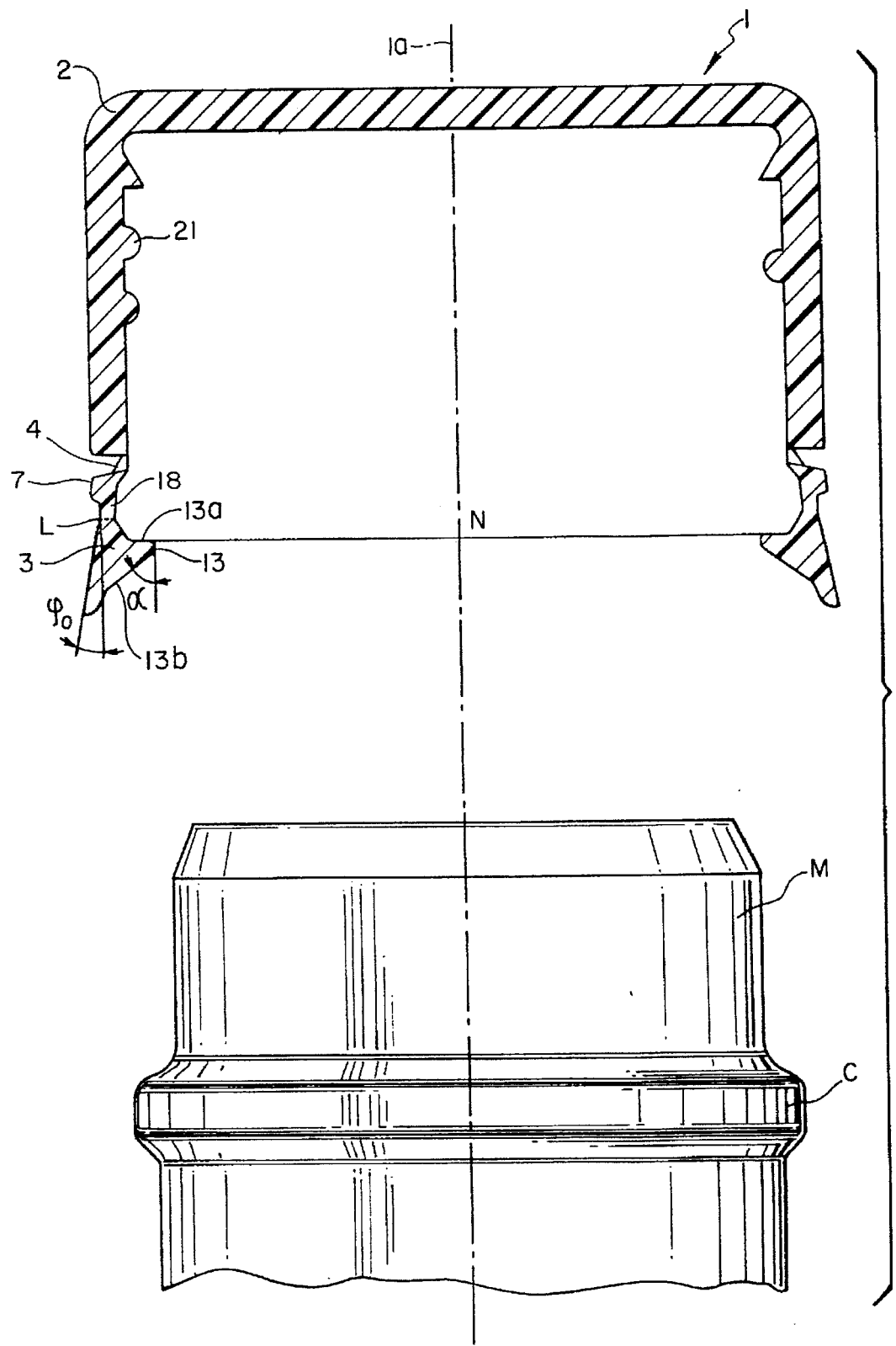
FIG. 1 shows a view in section of a closing device in the free state with a preforming mandrel in inactive position.

Referring now to the drawings, the closing device 1 shown in FIG. 1 is constituted by a tapped closing device 2 extended in its lower part by a tamper-proof ring 3 joined to the closing device 2 by a breakable connecting zone 4. The ring 3 comprises a deformable annular joining strip 18, with controlled deformation, defined, on the one hand, in its lower part, by an inner annular projection 13 whose upper face 13a is substantially normal to the axis 1a of the device and whose lower face 13b is inclined by an acute angle α with respect to the axis 1a and, on the other hand, in its upper part, by an outer annular projection 7.

This outer annular projection 7 has a width substantially equal to the thickness of the closing device 2.

The annular joining strip 18 lies between the normal N to the axis 1a of the device, passing through the upper face 13a of the inner projection 13 and the lower edge of the outer projection 7.

The process of manufacture comprises the prior operations of moulding by injection or by compression of the device 1 in a mould (not shown), demoulding then ejection parallel to the axis 1a.

Before or after cooling and withdrawal of the material constituting the tamper-proof ring 3 or hot upon exit from the mould, a preforming of said ring is then effected. This preforming is made by firstly introducing in the device 1 and along its axis 1a, as shown in FIG. 2, a cylindrical mandrel M (already shown in inactive position in FIG. 1) whose diameter is slightly less than the inner diameter of the threads 21 of the tapped closing device 2.

Figure 2:
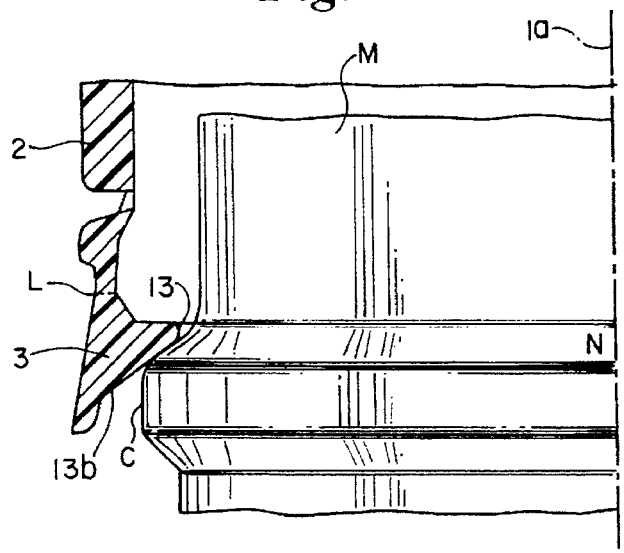
FIG. 2 shows a view in partial section of the device of FIG. 1 during a first phase of the process of the invention.
Figure 3:
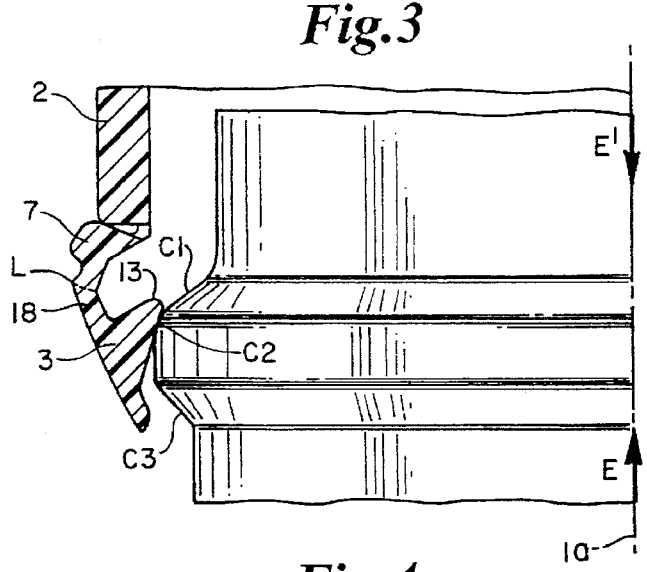
FIG. 3 shows a view in partial section of the preceding device during the preforming phase.

In FIGS. 2 and 3, the mandrel M is engaged in the closing device 1 vertically and from underneath, but it is, of course, possible to carry out the process of the invention in other positions.

Mandrel M is provided with an annular peripheral cam C such that the lower face 13b of the inner annular projection 13 comes into abutment vertically against said cam C upon introduction of the mandrel M.

According to another embodiment (not shown), the cam C is formed at the upper end of the mandrel M.

The end of the mandrel M is possibly bevelled as shown in FIG. 1.

Figure 4:
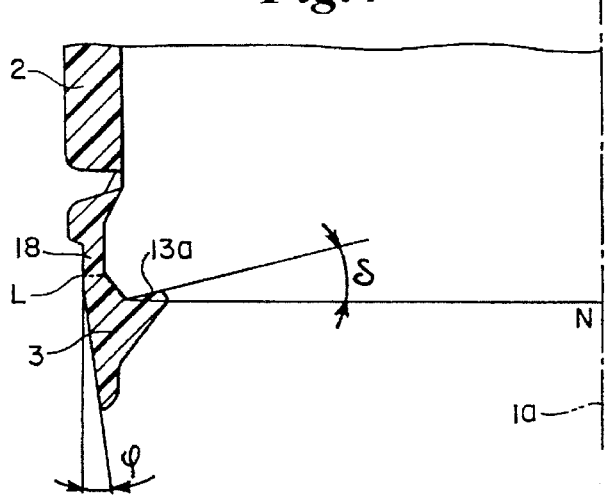
FIG. 4 shows a view in partial section of the closing device of FIGS. 1 to 3 in the preformed state.

Then there is exerted on the device 1 and/or on the mandrel M, as shown in FIG. 3, a bearing effort E, E' along axis 1a whose force is sufficient to ensure, from the stop position (FIG. 2) a relative stroke of the mandrel M in the ring 3 upon contact of cam C, up to a preforming position. This position which corresponds to the end of relative stroke of the mandrel M with respect to the ring 3, brings about a forced and controlled deformation of said ring 3. In this position, the outer projection 7 of the ring 3 is in abutment against the lower edge of the closing device 2. The position of preforming is maintained for a determined time so as to produce jointly an outward bending of the joining strip 18 with controlled deformation, and a remanent deflection towards the closing device 2 of the inner annular projection 13. This results in that the upper face 13a of said projection 13 remains inclined by an angle δ with respect to the normal N to the axis 1a of the device 1 after elimination of the effort E, E' and egress of the mandrel M as shown in FIG. 4.

In this perspective, the profile and position of the cam C of the mandrel M are determined to allow a clear stop, at the beginning of stroke, of the lower face 13b of the inner projection 13 of the ring 3, while avoiding, at the end of stroke, a clipping of said projection.

The useful part of the cam C of the mandrel M comprises for example a plane and inclined active face C1 with curvilinear lateral edge C2 whose profile and geometry are adapted to the lower face 13b of the inner projection 13 to obtain the desired deformation. The lateral edge C2 is extended (downwardly in the orientation of the closing device 2 in FIGS. 1 to 3), by an inactive face C3 which never comes into contact with the lower edge of the ring 3 oriented towards axis 1a during preforming.

Furthermore, the profile and geometry of the mandrel M are determined as a function of the position of the cam C so that it never comes into contact either with the bottom of the closing device 2 or with its inner walls and to that end, it is equipped with a mechanical stop which guarantees the precision of the relative stroke necessary.

Moreover, the profile of the cam C of the mandrel M is independent of the geometry of the flanges of the containers on which the closing device 1 is intended to be mounted.

The amplitude of the preforming is determined so that the remanent inclination δ of the upper face of the inner projection 13 compensates at least the initial deformation produced upon ejection from the mould; i.e. the overall deformation resulting from the preforming compensates at least the initial angular spacing $\phi_o$ with respect to the axis 1a of the outer face of the lower part of the ring 3 resulting from demoulding, as shown in FIG. 1.

The initial angular spacing $\phi_o$ begins at the top, in the vicinity of a circular line L lying substantially half way up the joining strip 18 and results from the pivoting of the lower part of the ring 3 upon demoulding of the inner projection 13 (cf. FIG. 1). Preforming therefore consists in effecting a remanent deformation of the ring 3 accompanied by a bending which is produced along the circular line L lying on the joining strip 18 with controlled deformation.

It is also possible, in certain cases, to effect bending of the strip 18 in remanent form to obtain a greater degree of preforming.

The remanent inclination δ of the upper face 13a of the inner projection 13 with respect to the normal N to the axis 1a is less than or equal to 25° and is preferably included between 10° and 15°.

This results in that the outer lateral face of the lower part of the ring 3 remains slightly inclined by an angle φ included between 0° and 15° towards and with respect to the axis 1a of the closing device 2 which also improves the impregnability by reducing, after closure of the container, the free space between the lower edge of the ring and the neck of said container.

The force, the duration of the bearing effort E, E' as well as the relative stroke of the mandrel M are determined as a function of the mechanical characteristics of the material constituting the tamper-proof ring 3 and/or as a function of the temperature of said ring 3 at the moment of preforming and/or of the profile and geometry of the ring.

The force, the duration of the bearing effort E, E' and the relative stroke of the mandrel M therefore also depend on the respective geometries of the annular projection 13 and of the joining strip 18 with controlled deformation with respect to the profiles of the container flanges.

For profiles and/or particular qualities of these flanges, the duration of the bearing effort E, E' and/or the relative stroke of the mandrel M will, if necessary, be adapted to guarantee a uniform controlled deformation of the joining strip 18 without rupture of the breakable connection zone 4.

Of course, the duration of the bearing effort is greater than or equal to the time of holding the cam C of the mandrel M in preforming position, in contact with the inner annular projection 13.

Generally, the bearing effort is of the order of 10 to 100 daN and the holding time is included between 0.3 and 5 s.

The material constituting the ring 3 is preferably a plastics material with shape memory, of the polypropylene or polyethylene type.

Preforming may be analyzed as a selective and remanent orientation of the molecular chains of the polymer material constituting the ring, facilitating and then improving the controlled deformation of the strip 18 during screwing of the closing device.

Upon screwing on the container after bottling, the preformed tamper-proof ring will then undergo, with a limited torque, the deformation necessary for clipping beneath the flange even if it is considerably rigid and presents a very marked catching profile.

Figure 5A:
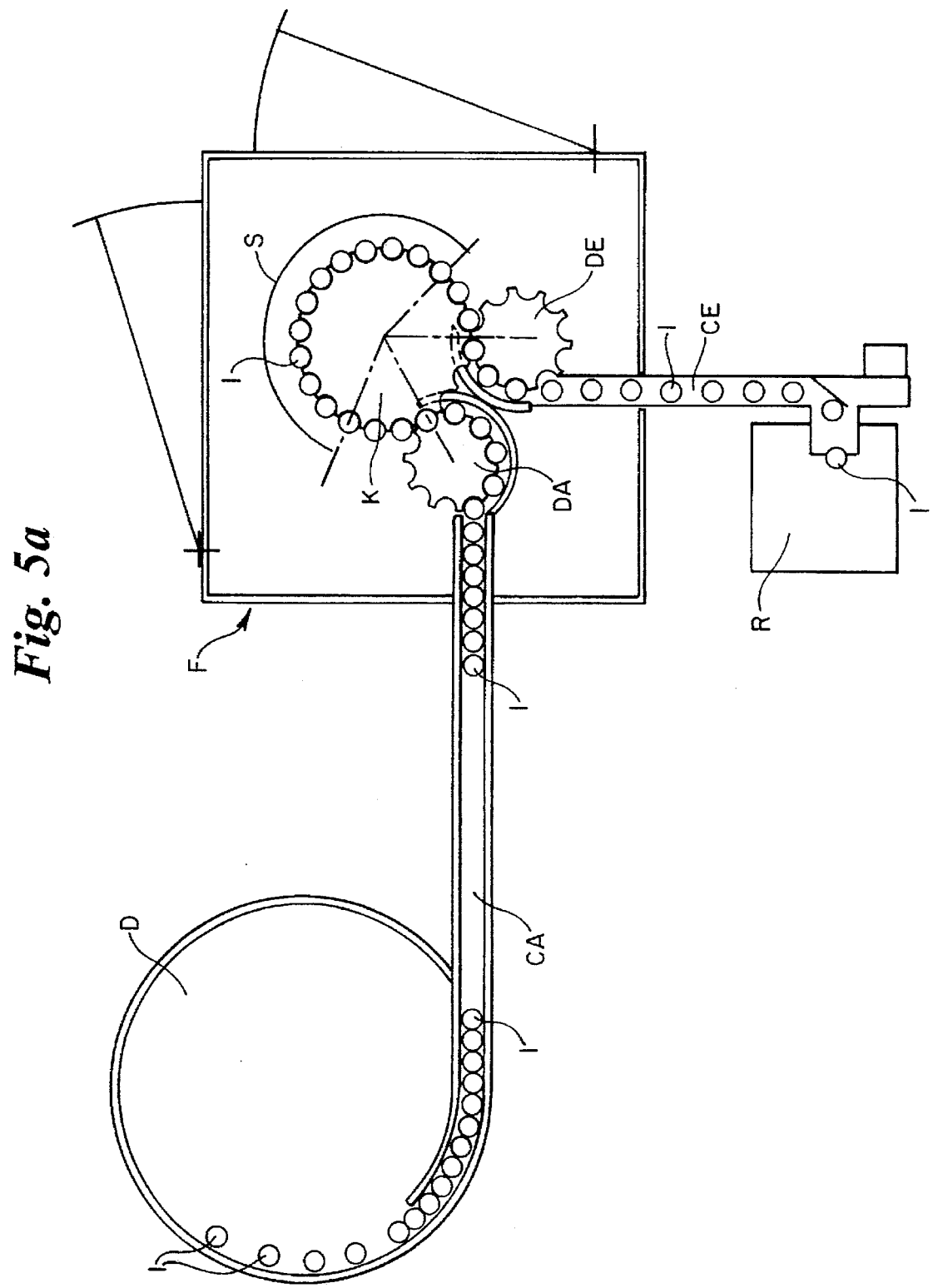
FIGS. 5a and 5b respectively show a plan view and a view in partial vertical section of an embodiment of a preforming machine according to the invention.
Figure 5B:
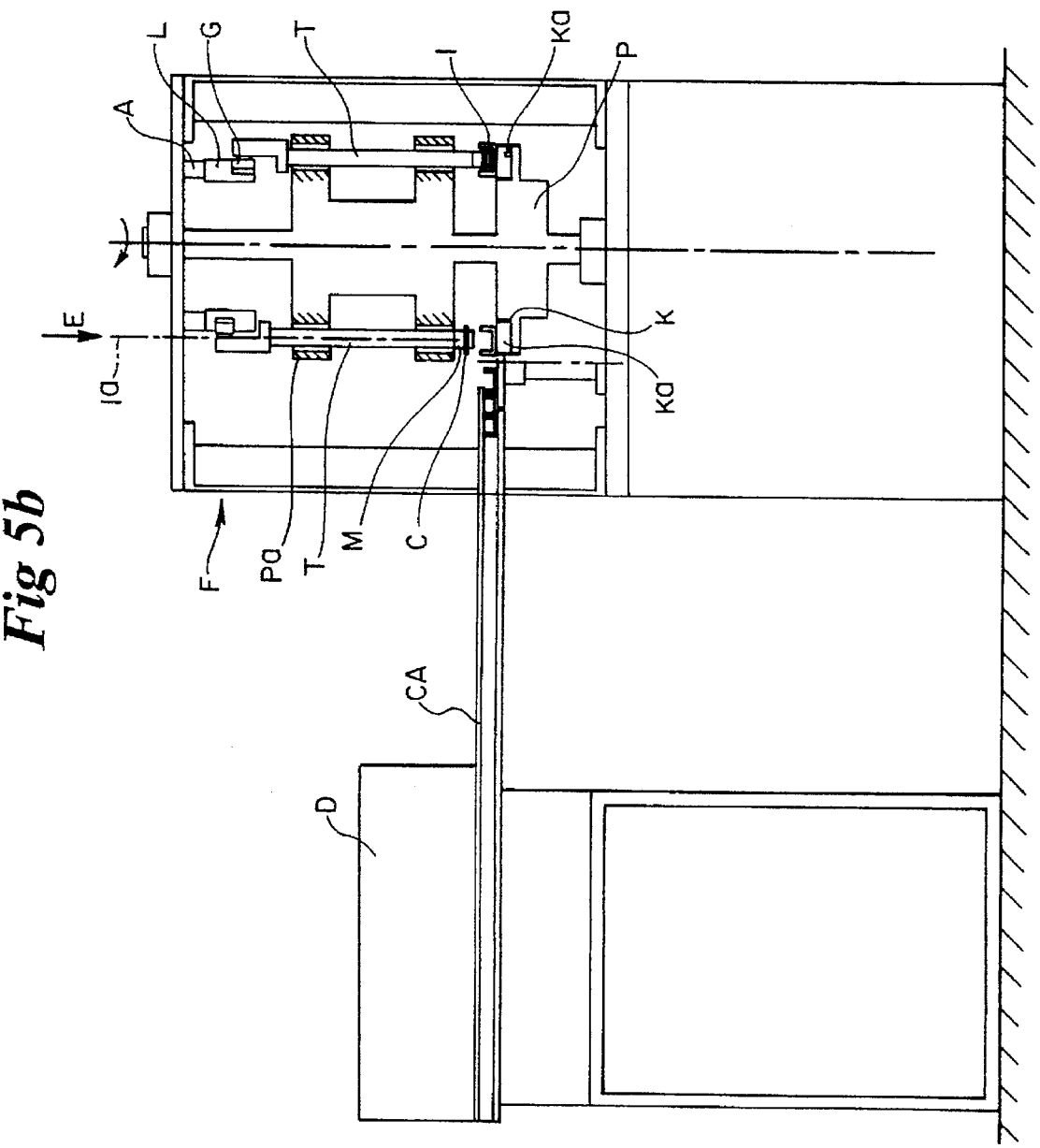

The machine for continuously carrying out preforming, as shown in FIGS. 5a and 5b, comprises a dispenser D of closing devices 1 with their tamper-proof ring, conveyors CA, CE intended to transfer respectively the devices 1 firstly from the dispenser D to a preforming unit F then from said unit F to a storage receptacle R.

The dispenser D may, if necessary, be supplied directly by the devices leaving the mould.

The preforming unit F comprises a plate P rotating about a vertical pin bearing a matrix K for supporting and positioning the devices 1 to maintain them firmly with the ring 3 upwardly. It may also be provided that matrix K and plate P be made in one piece. The preforming unit F further comprises vertical rods T sliding through bearings Pa and whose lower ends bear a cylindrical mandrel M equipped with an annular peripheral cam. The mandrel M is intended to be introduced by the top in devices 1 under the action of the bearing effort E exerted vertically along axis 1a by the rods T parallel to the axis of rotation of the plate P.

The descent of rods T with their mandrel M places cam C in contact with the inner annular projection 13 of the ring 3 of the devices 1 as described previously.

The phase of preforming corresponds to an angular sector S of the matrix K where the rods T are in low position with the cam C of the mandrel M in abutment on the inner projection of the ring.

Rotation of the plate P with the matrix K supporting the devices 1 is effected continuously.

A system with roller G, rolling cam L, and adjusting shim A makes it possible to obtain a mechanical stop of the mandrel M in low position (right-hand part of FIG. 5b).

The rotation of roller G, following the profile of the rolling cam L, successively ensures transmission of the bearing effort E, the descending stroke of the rods T with the mandrel M, the holding of cam C in preforming position for a time corresponding to the path of the sector S by the device 1, then the ascending stroke for rising of mandrel M.

Matrix K is constituted by a disc comprising a plurality of peripheral recesses Ka in which the stopping devices 1 are firmly housed, centred and retained.

Matrix K is associated by mechanical synchronization with rotating toothed wheels DA, DE respectively for supply and evacuation, working in line with conveyors CA, CE.

What is claimed is:

1. Process for manufacturing a closing device for a flanged container constituted by a tapped closing portion and a tamper-proof ring joined to a lower part of the closing portion by a breakable connection zone; the ring comprising an annular joining strip with controlled deformation, said ring defined adjacent a lower end of said annular joining strip by an inner annular projection, an upper surface of which is substantially normal to a central axis of the device and a lower surface of which is inclined by an acute angle defined by said axis and a line along said lower surface, and said ring defined adjacent an upper end of said annular joining strip by an outer annular projection, the process comprising moulding, demoulding and ejecting said device parallel to said axis, wherein a preforming of the tamperproof ring is then effected by axially introducing in said device a cylindrical mandrel having a diameter which is slightly smaller than an inner diameter of threads of the tapped closing portion, said mandrel being provided with an annular peripheral cam such that the lower surface of the inner annular projection comes into abutment against said cam, by exerting on one of said device and the mandrel a bearing effort whose force is sufficient to ensure a stroke of the mandrel in the device such that the lower surface is in contact with the cam up to a preforming position of the mandrel which is maintained for a determined time so as to produce an outward bending of the strip with controlled deformation thereof such that upon elimination of said bearing effort a remanent deflection towards said closing portion of the inner annular projection will remain so that said upper surface will remain inclined by an angle defined by a line along said upper surface and a normal to the axis of the device, and by withdrawing said mandrel and eliminating said bearing effort.

2. The process of claim 1, wherein hot preforming is effected on the device as soon as it is ejected from a mould.

3. The process of claim 1, wherein preforming is effected on the device after ejection from a mould during or after initiation of cooling and complete withdrawal of material constituting the ring.

4. The process of claim 1, wherein an amplitude of the preforming is determined so as at least to compensate initial deformation produced during ejection from a mould.

5. The process of claim 1, wherein the force, duration of the bearing effort as well as the stroke of the mandrel are a function of mechanical resistance of a material constituting the ring.

6. The process of claim 1, wherein the force, said determined time, the bearing effort, as well as the stroke of the mandrel are a function of the ring's temperature during preforming.

7. The process of claim 1, wherein the stroke of the mandrel and said determined time in said preforming position are determined in accordance with respective geometries of the inner annular projection and of the joining strip with controlled deformation with respect to profiles of the tamper-proofring.

8. The process of claim 1, wherein the inclination of the upper surface of the inner annular projection with respect to the normal of the axis of the device is no greater than 25° after said remanent deflection is introduced.

9. The process of claim 1, wherein an inclination of said lower surface of the inner annular projection of the ring is between 0° and 15° defined by a line along said outer surface and the axis of the device after said remanent deflection is introduced.

10. The process of claim 1, wherein the bending is produced along a circular line located on the joining strip with controlled deformation, ensuring a selective orientation of molecular chains of a polymer constituting the ring on said circular line.

11. The process of claim 1, wherein the bearing effort is exerted on one of the closing device and the mandrel with a duration greater than or equal to said determined time in preforming.

12. The process of claim 1, wherein the bearing effort is between $10^7$ and $10^8$ dynes and said determined time in said preforming position is between 0.3 and 5 s.

13. The process of claim 1, wherein a plastic with shape memory is used as material constituting the device.

* * * * *